United States Patent [19]
Callahan et al.

[11] Patent Number: 5,509,731
[45] Date of Patent: Apr. 23, 1996

[54] EJECTING STORAGE CASE

[75] Inventors: Steven E. Callahan; Todd K. Dyment, both of Clinton, Mass.; Anthony L. Gelardi, Cape Porpoise; Tyler Fitzsimmons, Kennebunkport, both of Me.

[73] Assignee: Microplas, Inc., Clinton, Mass.

[21] Appl. No.: 136,829

[22] Filed: Oct. 18, 1993

[51] Int. Cl.⁶ .................................... A47B 81/06
[52] U.S. Cl. .................. 312/9.22; 312/9.63; 312/111
[58] Field of Search ................... 312/9.18, 9.19, 312/9.21, 9.22, 9.63, 111

[56] References Cited

U.S. PATENT DOCUMENTS

| | | | |
|---|---|---|---|
| 336,345 | 2/1886 | Pohl | 312/111 |
| 1,565,943 | 12/1925 | Fitzpatric . | |
| 2,121,190 | 6/1938 | Fellowes | 312/111 X |
| 3,332,394 | 5/1969 | McCune et al. . | |
| 3,389,942 | 6/1968 | Jacob . | |
| 3,492,046 | 1/1970 | Wittner et al. | 297/248 |
| 3,603,460 | 9/1971 | Notes . | |
| 3,613,895 | 10/1971 | Larkin . | |
| 3,661,434 | 5/1972 | Alster | 312/111 |
| 3,856,369 | 12/1974 | Commiant | 312/9.22 X |
| 3,969,007 | 7/1976 | Lowry | 312/9.21 |
| 3,995,921 | 12/1976 | Ackeret . | |
| 4,087,138 | 5/1978 | McRae | 312/9.22 |
| 4,121,877 | 10/1978 | Brown . | |
| 4,162,112 | 7/1979 | Kockler . | |
| 4,270,817 | 6/1981 | McRae . | |
| 4,330,162 | 5/1982 | Aboussouan | 312/9.21 |
| 4,339,162 | 7/1982 | Gelardi | 312/9.21 |
| 4,549,775 | 10/1985 | Carter | 312/9.63 |
| 4,647,118 | 3/1987 | Kamperman . | |
| 4,655,345 | 4/1987 | Drake et al. . | |
| 4,668,027 | 5/1987 | King et al. . | |
| 4,702,533 | 10/1987 | Seifert | 312/9.22 |
| 4,728,159 | 3/1988 | Solomon et al. | 312/111 |
| 4,772,077 | 9/1988 | Beam et al. . | |
| 4,819,802 | 4/1989 | Gutierrez . | |
| 4,900,107 | 2/1990 | Long et al. | 312/9.21 |
| 4,929,861 | 5/1990 | Metcalf | 312/9.63 |
| 5,000,526 | 5/1991 | Comerford . | |
| 5,104,207 | 4/1992 | Lockhardt . | |
| 5,360,107 | 11/1994 | Chasin et al. | 312/111 |
| 5,392,063 | 2/1995 | Rhoads | 312/9.63 |
| 5,399,004 | 3/1995 | Buschle | 312/9.63 |

FOREIGN PATENT DOCUMENTS

| | | | |
|---|---|---|---|
| 2803302 | 8/1979 | Germany | 312/111 |
| 1173159 | 12/1969 | United Kingdom | 312/111 |

*Primary Examiner*—Peter M. Cuomo
*Assistant Examiner*—David E. Allred
*Attorney, Agent, or Firm*—James Creighton Wray

[57] ABSTRACT

A storage device stores computer data cartridges in individual boxes. The storage device can store multiple boxes of computer cartridges. Preferably six boxes are stored in one case. The case has two side walls, a back, an upper wall, and a lower wall. A case with multiple inner dividers forms inner chambers for holding and separating one box from another. An ejector is associated with each of the chambers. Each ejector has an elongated and tilted floor member extending from the front of the ejector to the back of the case. The upward tilted position of the floor member holds the boxes against the upper wall and back of the case and therefore does not allow unintentional ejection of the boxes. Pushing the ejector downward forces the tilted floor member downward, sliding and ejecting the box outward under its own weight. A comb-like clamp and ejector assembly has rear grippers that grip a downward edge of the back. Fulcrums upwardly tilt forward cantilevered fingers which form the floors of the chambers. Forward ends of the floors are pressed downward to admit cartridges then spring upward to hold the cartridges. Pressing downward on a forward end slopes a floor downward to slide out a cartridge. Elongated sloped legs dovetail into sloped recesses in the top for locking stacked cases together. Elastomeric non-skid feet attach to ends of the legs on laterally adjacent cases to lock a bottom row of cases together.

17 Claims, 5 Drawing Sheets

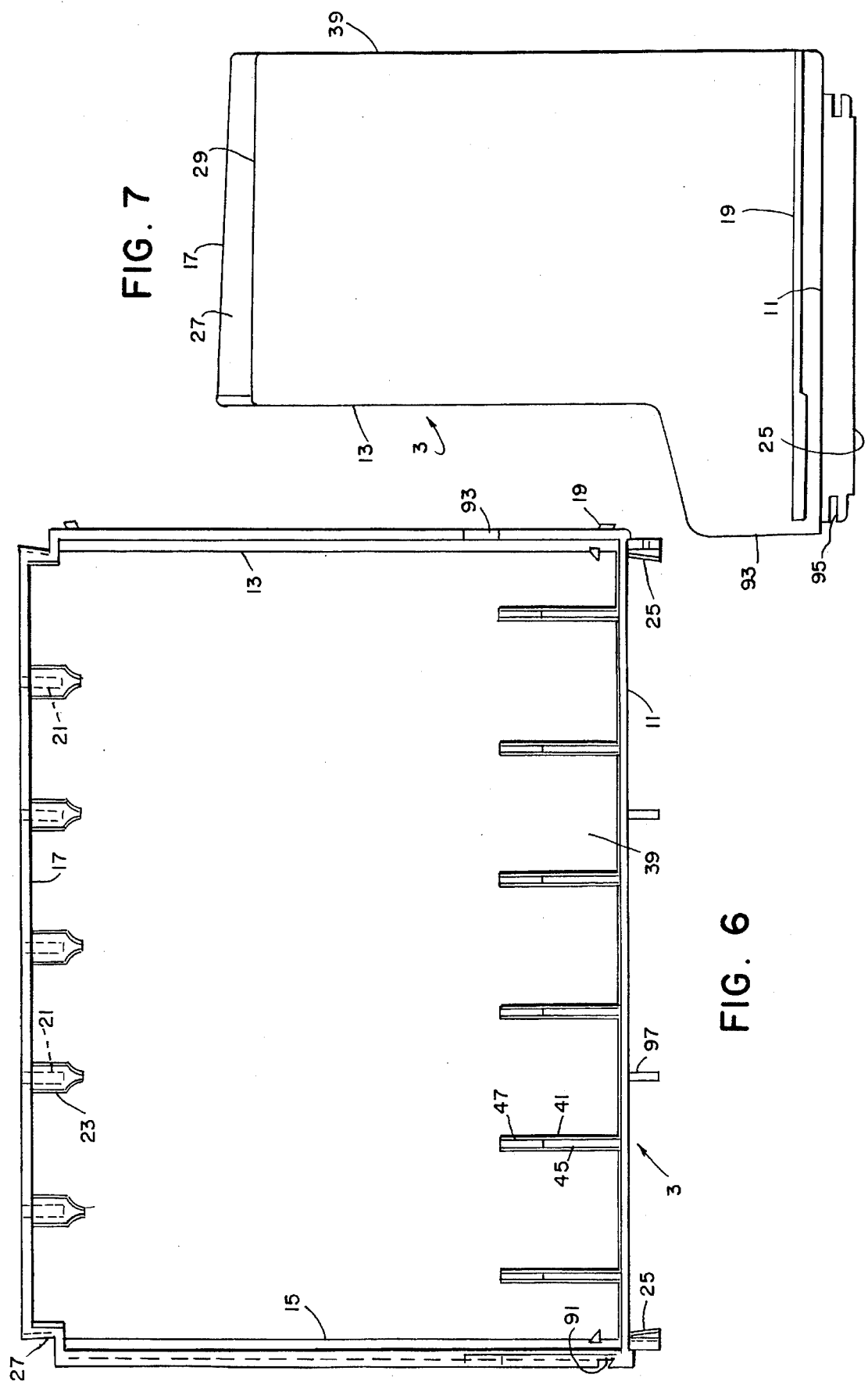

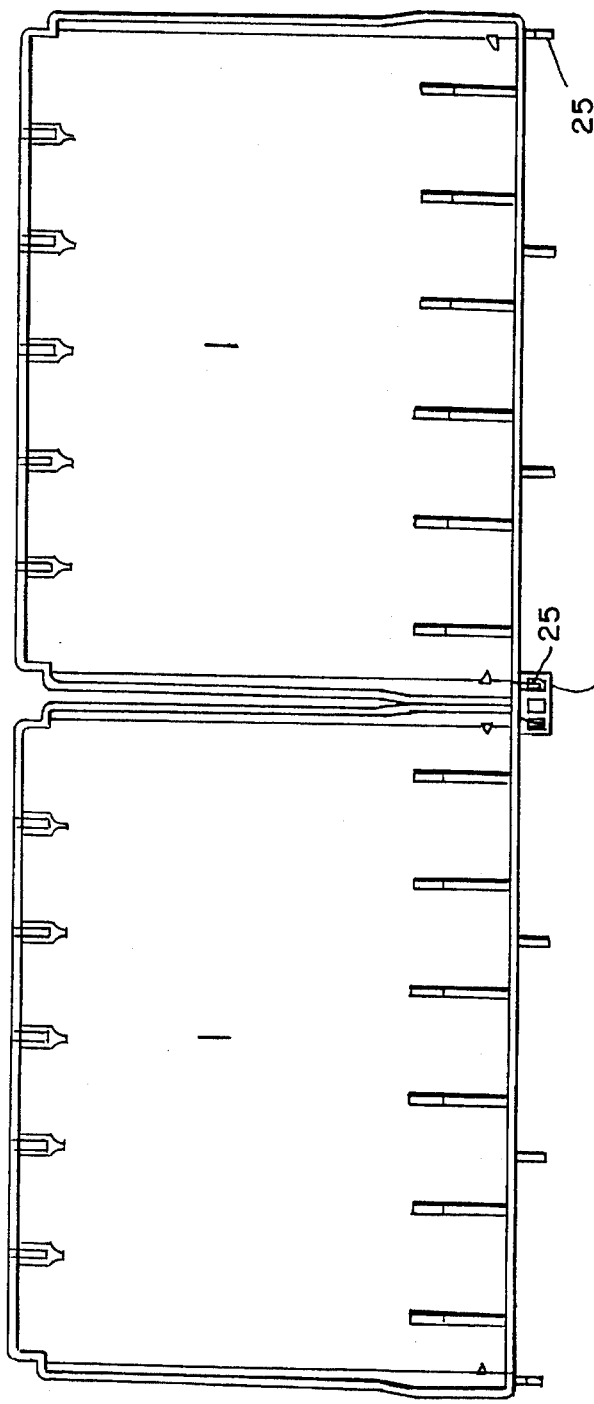

EJECTING STORAGE CASE

BACKGROUND OF THE INVENTION

This invention concerns a storage case for data cartridges.

Data cartridges store data away from computers and have reels, tapes and drives for loading programs from the data cartridges into the computers, or for storing information from the computers in the data cartridges. The data cartridges are relatively heavy, weighing more than 10 ounces, and are stored in rectangular plastic boxes about 6½×4½×⅞inches. Usually the data cartridges in the boxes are stored vertically, resting on a shorter edge, with spines of the storage boxes exposed and labelled to indicate the contents of the data cartridges. As described herein, the cartridges are individually boxed cartridges. The words "cartridges" and "storage boxes" may be used interchangeably.

Often the storage boxes are stored in cases which contain up to ten data cartridges. The data cartridge storage boxes are fully enclosed in the cases, or are partially exposed by the cases, so that the boxes may be removed from the cases.

One such device has a raised front edge of a case so that the data cartridges and storage boxes tilt rearwardly.

A problem exists in that the data cartridges are held loosely with the cases. If the cases are transported or tilted or shocked with an unintended bump or while removing or inserting a box, for example, the data cartridges may fall out of the cases.

In devices which tip the data cartridges rearward, a cartridge must first be tipped forward, and then taken between the fingers and thumb to move the cartridge the rest of the way out of the case.

Because other devices require physical pulling of a cartridge storage box from the case, a tendency exists to pull the cartridge box and case forward, possibly off the edge of a surface on which the case rests, or to tilt the entire case forward, causing all of the cartridges to spill onto a desk or the floor.

Existing products enclose ten units. Most users work with five or six cartridges if they do daily and weekly drive backups (Monday - Friday, and weekly). Existing products offer no easy way to access the cartridges. Cartridges stick in the slots provided for storage, and often the entire unit will slide on the work surface when attempting to insert or remove a cartridge. Prior art devices have no positive retention to hold the cartridges, when units are tipped.

The storage of data cartridges creates many problems which have existed from the beginning of use of data cartridges to the present.

SUMMARY OF THE INVENTION

The present invention solves the problems existing in the prior art. The present invention stores computer backup data cartridges, such as quarter inch data cartridges. Quarter inch refers to tape width. The invention has many new features.

The new locking ejector provides full viewing access to the cartridge spine label. A modular concept allows the consumer to build collections of cases horizontally or vertically as work space allows. Touch keys provide access to each individual cartridge. A consumer merely has to depress an appropriate key, and a selected cartridge automatically slides into an accessible position. When the cartridges are in stored positions they are vertical and are flush with the face of the case and provide a clean appearance. In addition, the cartridges are positively retained in the case. Cartridges would not fall out if the case were tipped over. Because several cases are locked together in a an array, stability of the cases is increased.

Major benefits are the locking, flush storage, the modular design, stability and the ease of access to each individual cartridge.

A preferred storage device stores computer data cartridges in individual boxes. The storage device can store multiple boxes of computer cartridges. Preferably six boxes are stored in one case. The case has two sides, a back, a top, and a base. Multiple inner dividers extending downward from the top form inner chambers for holding and separating one box from another. Sloped ramps extend upward from the base and forward from the back, and have forward and downward sloping upper surfaces. A lock is associated with each of the chambers. Each lock has an elongated and tilted floor member extending downward and rearward from the front of the ejector to the back of the case. The upward and forward tilted positions of the floor members hold the boxes against the top and back of the case and do not allow unintentional ejection of the boxes. Pushing the lock downward forces the tilted floor member downward, sliding the box downward and forward along the ramp and ejecting the box outward under its own weight.

A comb-like lock assembly has rear grippers that grip a downward edge of the back. Fulcrums upwardly tilt forward cantilevered fingers, which form the floors of the chambers. Forward ends of the floors are pressed downward to admit cartridges and then spring upward to hold the cartridges. Pressing downward on a forward end slopes a floor downward to allow a cartridge to slide out. Wings on edges of the floors center the boxes on the floors and align the boxes with dividers extending downward from the top. The front of the case is open. Lower sides are extended forward to protect the release levers from bumps. The cases lock together laterally and dovetail top-to-base to form multiple case units. Anti-skid feet of adjacent cases lock the cases together for increased stability and side-to-side buildability.

These and further and other objects and features of the invention are apparent in the disclosure, which includes the above and ongoing written specification, with the claims and the drawings.

BRIEF DESCRIPTION OF THE DRAWINGS

FIG. 6 is a front view of the case.

FIG. 7 is a side elevation of the case.

FIG. 10 is a front elevation of cases locked together with non-skid feet,

FIG. 11 is an end elevation of the non-skid feet,

FIG. 12 is a top view of the non-skid feet,

DETAILED DESCRIPTION OF THE DRAWINGS

Figure 1:
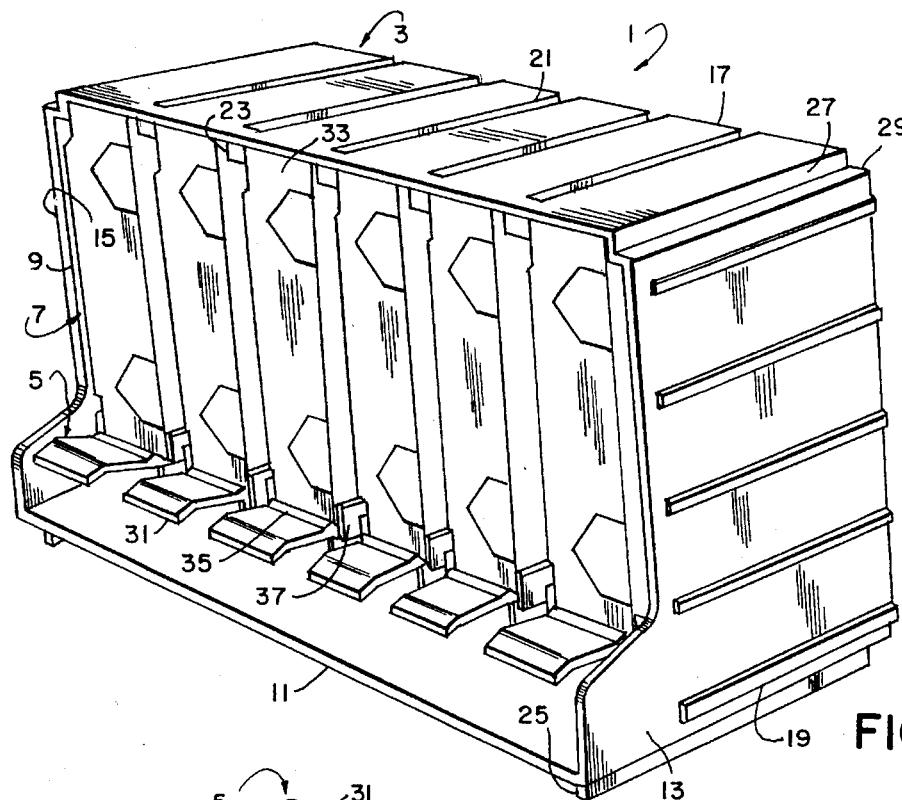
FIGS. 1 is a perspective view of the storage system of the present invention

Referring to FIG. 1, the data cartridge storage system is generally indicated by the numeral 1. The storage system has a case 3 and gripper ejectors 5 which hold data cartridges within individual storage boxes 7.

Spines of the cartridge are vertical and are flush with an opening 9 in the front of the storage case 3. The storage case has a base 11, first and second sides 13 and 15 and a top 17. Lands 19 are provided in side 13 to cooperate with complementary grooves in side 15 so that plural cases may be assembled together. Grooves 21 in the top 17 provide interior projections 23 opposite the grooves, which separate tops of individual storage containers 7. Long forward and rearward extending legs 25 are slightly inwardly sloped to grip the inwardly sloped complementary side edges 27 of the top in dovetail relationship so that the cases are vertically connected. Legs 25 rest upon the horizontal shelves 29, allowing multiple storage cases to be stacked, dovetailed and interlocked.

In operation, a selected finger pad 31 is depressed to eject an associated data cartridge box 33, allowing the box to slide forward over retention knob 35. Finger pads 31 are preferably concave to help center a finger for activating a single ejector.

Wings 37, which are connected to side edges of the retainers 5, hold the storage boxes 7 in spaced parallel vertical positions.

Figure 2:
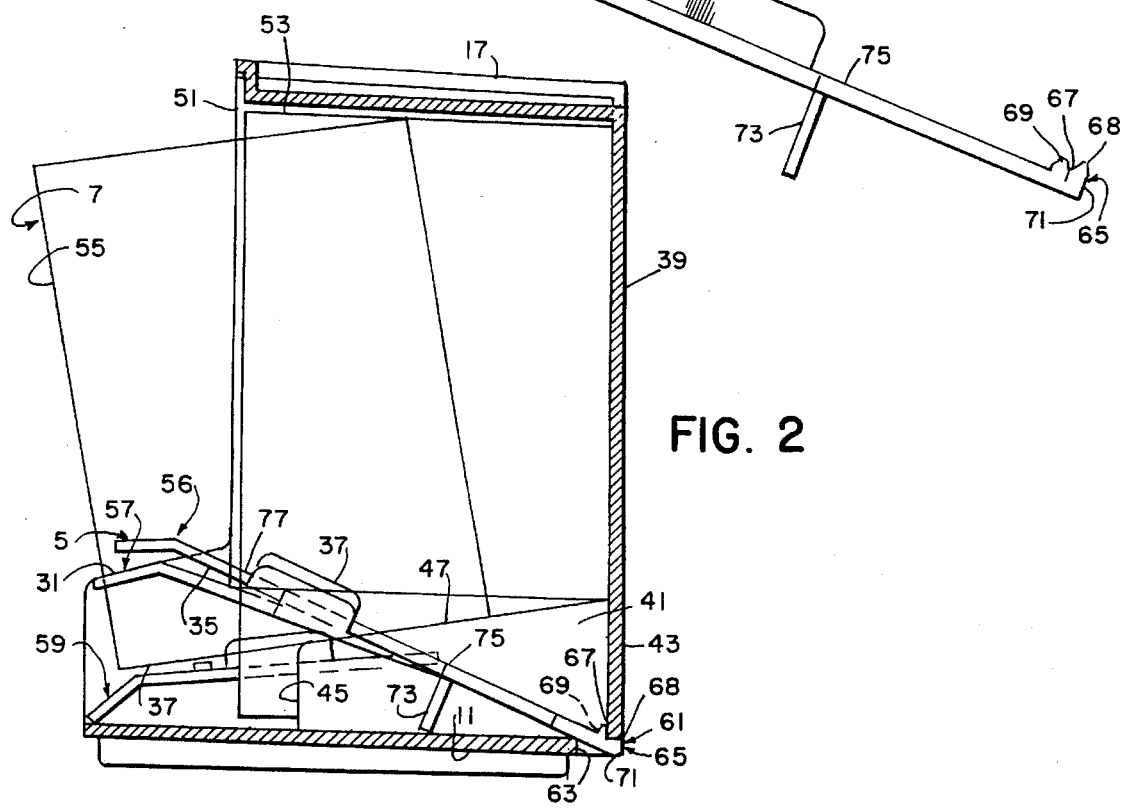
FIG. 2 is a side cross-sectional view showing the locking ejector in upper at rest position, locking position and ejection position.

As shown in FIG. 2, the case has a back 39. Plural parallel vertically oriented ramps 41 extend upward from the base 11 and outward from a lower portion 43 of the back. The flanges terminate forwardly in generally vertical front edges 45, and have downward and forward sloping upper edges 47, which form slides for lower surfaces 37 of the storage boxes 7.

As shown in FIG. 2, the storage boxes 7 have two positions. In the locked-in position 51 the top 53 of the storage box is held against the inside of the top 17 of the case, and the rear surface of the storage box is held against the inside of the back 39 of the case.

In the released position as 55, the storage box 7 has slid downward along the sloping ramp 47, which is the upper edge of the flange 41.

The locking ejector 5 is shown in three positions in FIG. 2. In the upper position 56 the associated chamber is empty, and the locking ejector 5 is at rest. In the middle position 57 the locking ejector 5 holds a data cartridge box 51 upward and rearward. In the lower ejecting position 59 the cartridge box 55 is allowed to slide outward and downward along ramp 41.

The ejectors are anchored in the case. A first anchor 61 is provided by the opening 63 in the intersection between the case bottom 11 and back 39. A second anchor 65 is provided by the groove 67 between the ridges 68 and 69 near a first end 71 of the locking ejector 5. Fulcrum legs 73 are provided along the bodies 75 of the locking ejector to provide a place at which radiusing of the leaf portion 77 begins. As the leaf portion is bent downward with pressure on the finger key 31, the data cartridge box 7 slides forward as shown in the position 55.

When the finger pad is released after a data cartridge has been inserted, the step 35 holds the data cartridge rearward while the leaf 77 urges the data cartridge upward and rearward. The wings 37 prevent lateral movement of the data cartridge.

While the leaf 77 is shown schematically in three separate positions, the bending of the forward portions of the leaves 77 occurs in an arc, so that the leaf is straight in the upper non-loaded position 56, and is slightly curved in the retaining position 57. The leaf is uniformly curved in the downward cassette box releasing position 59.

The leaves have been schematically shown as straight to better illustrate their operation.

The wings 37 are joined at their forward extremities to side edges of the leaf so that the rear portions of the wings extend upward during downward bending of the leaf. The upward extension of the wings guides the entry and exit of the data cartridge boxes 7. The forward connection of the wings to the leaf, as opposed to full connection along the length of the wings, helps the desirable radiused bending of the leaves.

Figure 3:
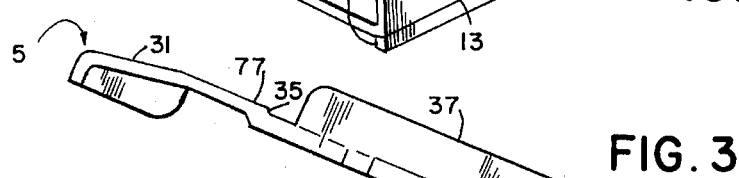
FIG. 3 is a side elevation of a modified locking ejector.

FIG. 3 is a side elevation of a locking ejector 5 showing in detail the elements referred to in relation to FIG. 2.

Figure 4:
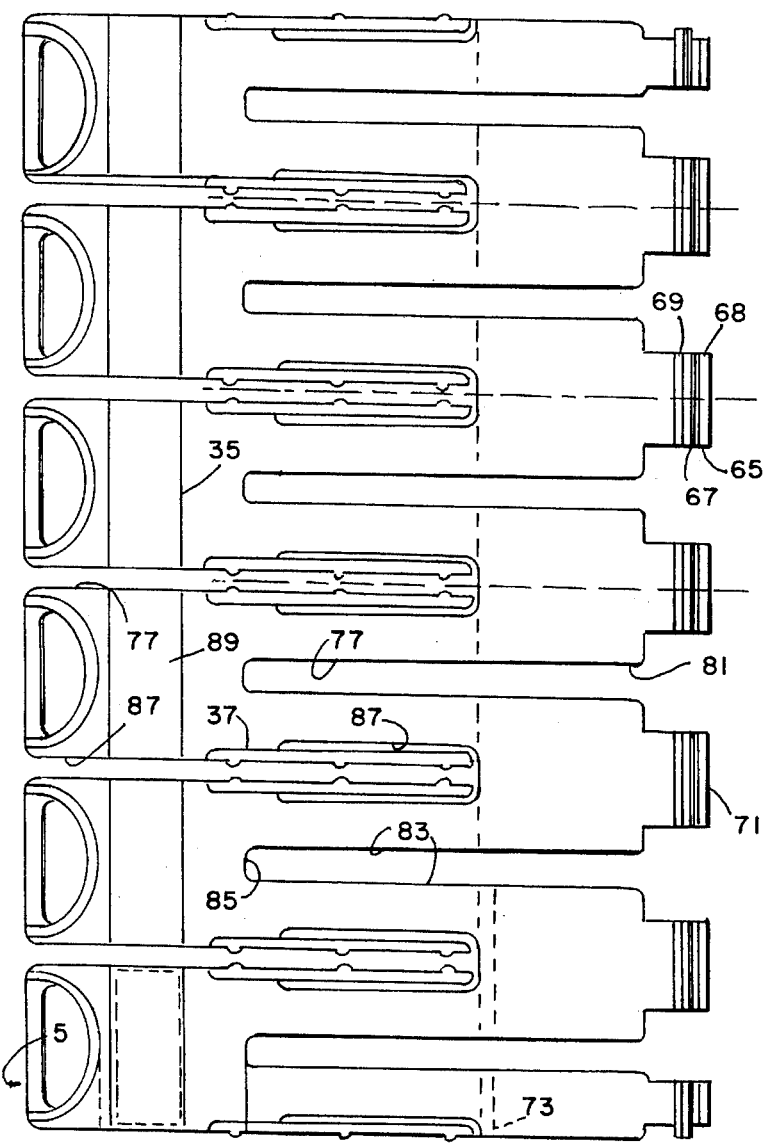
FIG. 4 is a plan view of a locking ejector assembly shown in FIG. 3.

FIG. 4 is a top view of the locking ejector assembly 5 showing the generally flat sinusoidal planform. Openings 81 extend forward from rearward portions 71 of the locking adjustors to receive the ramps. The openings 81 extend partially through the leaf portions 77, so that the leaf portions are generally U-shaped with parallel legs 83. The wings 37 are connected to the leaves 77 in front of the forward extremities 85 of the openings 81. The individual leaves are separated by spaces 87 which extend rearward from the finger pads 13 to the fulcrum legs 73. Retention ridges 35 extend across the front portions 89 of the U-shaped leaves 77. The anchors 65 are formed by the grooves 67 between the ridges 68 and 69 at the ends 71 of the ejector.

Figure 5:
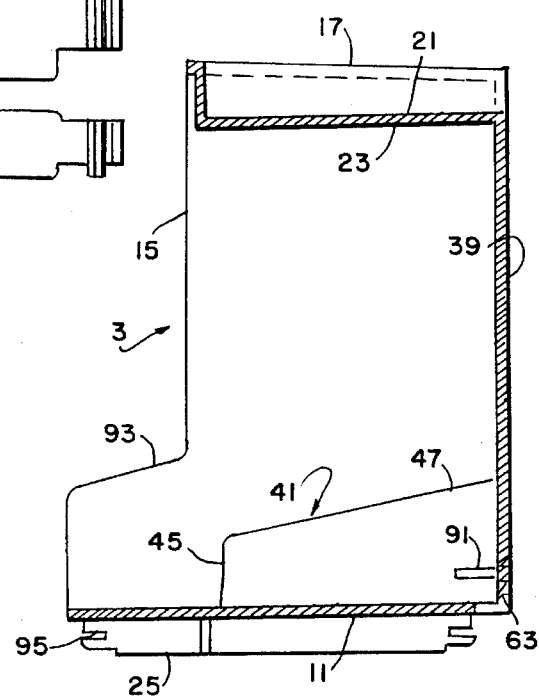
FIG. 5 is a side elevational cross-sectional view of the case.

The cross-section shown in FIG. 5 shows the general outline of the case 3 with the bottom 11, the top 17 and the inward extending surfaces 91 in side 15. The forward extending lower portion 93 of the case prevents accidental lateral jarring of the ejectors 5, as shown in FIGS. 1 and 2. The downward and forward sloping upper surfaces 47 of the ramps or flanges 41 extend from back 39 to front edges 45 of the ramps.

The support legs 25 extend from near the front of the case to near the rear of the case. Notches 95 may secure rubber feet to opposite ends of legs 25. The grooves 21 extend forward and rearward.

FIG. 6 shows a front view of a case 3 and the front faces 45 and sloping surfaces of ramps 41. The base 11, sides 13 and 15 and back 39 are shown. The feet 25 dovetail in top grooves 27 to lock superimposed cases together. Intermediate straight rectangular legs 97 fit in grooves 21 in the top 17 to add stability to stacked cases. Dovetailed extensions 19 extend into grooves 91 to lock laterally adjacent cases together.

FIG. 7 is a side elevation showing the side 13 and the tapered lands 19 which extend from the side 13 and fit into complementary grooves 91 in side 15, as shown in the front elevation of FIG. 6. The ramps 41 are shown from their front edges 45.

The grooves 21 in the top 17 form the inward extensions 23, which separate tops of the data cartridge storage boxes 7, as shown in FIG. 1.

Figure 8:
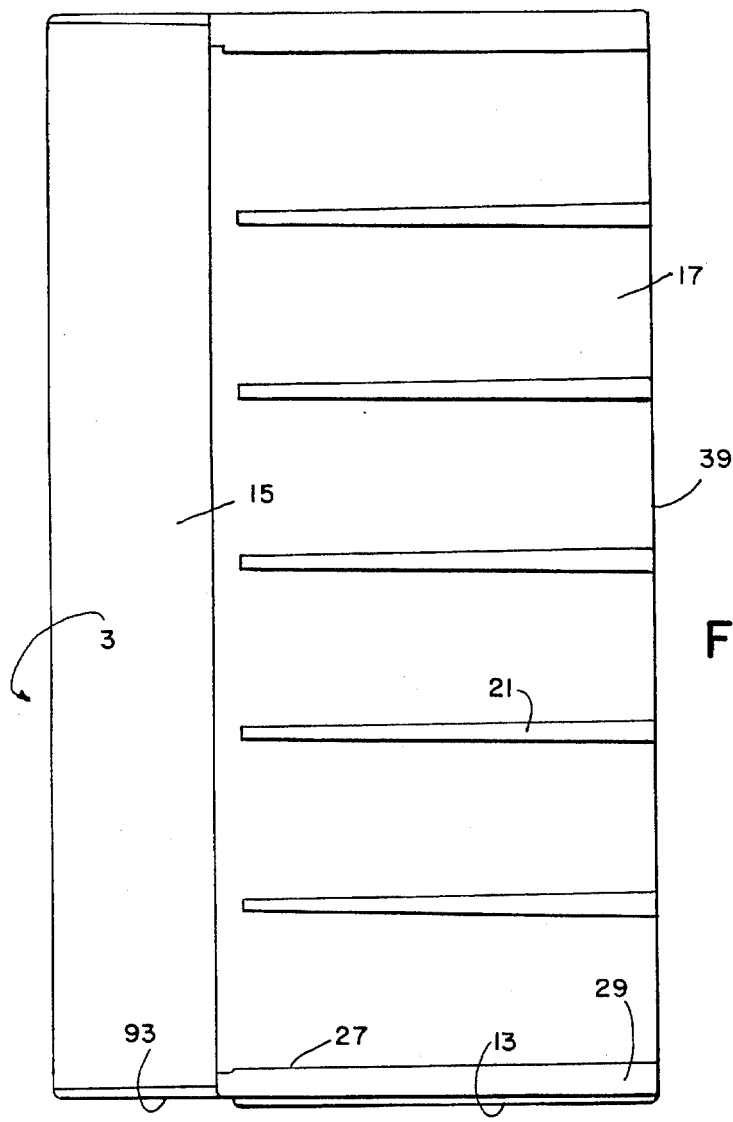
FIG. 8 is a top view of the case.
Figure 9:
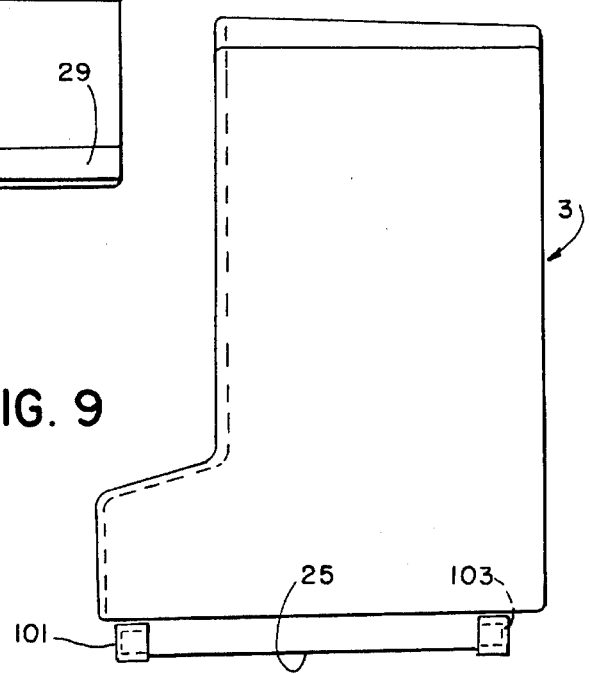
FIGS. 9 is a side elevation of a case with non-skid feet.

FIG. 8 shows a top view of the top 17 of the case 3.

Referring to FIGS. 9-12, laterally adjacent cases are locked together by elastomeric non-skid feet 101 which fit on forward and rearward projections 103 on legs 25. The non-skid feet have three cavities 105, any of which may receive a projection 103. When the feet are connected to legs at the ends of an assembly of cases, outer cavities may be used. The central cavity provides limited flexibility and resilience of the nonskid feet 101.

While the invention has been described with reference to specific embodiments, modifications and variations of the invention may be constructed without departing from the scope of the invention, which is defined in the following claims.

We claim:

1. A storage case comprises a housing with a bottom, first and second side walls extending upward from opposite ends of the bottom, and a top extending across upper ends of the first and second side walls and a back joining the bottom, top and side walls, parallel ramps extending upward from the bottom and connected to lower portions of the back, the ramps having upper surfaces sloping downward and forwardly from the back, a first anchor along a lower portion of the back, a retainer-ejector having a second anchor complementary with the first anchor, and having elongated openings for receiving the ramps, and having fulcrum legs extending downward between the openings and oriented transversely thereto, and having plural leaves extending forward from the fulcrum legs, with finger pads at fronts of the leaves, the fulcrums and anchors urging the fronts of the leaves upward for urging data cartridges upward and rearward toward the top and back, the leaves being flexible and depressible about the fulcrums for allowing data cartridges to slide downward and forward on the leaves and on sloping upper surfaces of the ramps when the finger pads are depressed.

2. The apparatus of claim 1, further comprising wings on opposite side edges of the leaves for preventing lateral movement of the data cartridges.

3. The apparatus of claim 1, wherein the first anchor comprises an opening at an intersection of the back and bottom, and wherein the second anchors comprise upward extensions on rear edges of the retainer-ejector, forming grooves therebetween for receiving a lower edge of the back at the opening.

4. The apparatus of claim 1, wherein the leaves are separated by spaces extending parallel to the side walls, and wherein the spaces extend rearward from the finger pads to the downward extending fulcrum legs.

5. The apparatus of claim 1, wherein the leaves are U-shaped with parallel forks with ramp-receiving openings extending between the forks of the leaves.

6. The apparatus of claim 1, wherein the downward extending fulcrums are mounted between the ramps, and wherein the ramps extend through the openings and extend forward of rearward ends of the leaves.

7. The apparatus of claim 1, further comprising legs extending downward and inward from opposite sides of the case, and complementary downward and inward extending grooves in upper corners at intersections of the sides and top of the case for receiving legs of an adjoining case in interlocking relationship as cases are stacked.

8. The apparatus of claim 1, further comprising downward extending legs at opposite ends of the bottom and forward and rearward extensions on the legs for receiving elastomeric feet, and elastomeric feet connected to the extensions, the elastomeric feet having multiple cavities for connecting first cavities to extensions of legs at the back of one case and connecting other cavities to extensions of a leg of an adjacent case for laterally interconnecting cases in an array.

9. Magnetic media storage case apparatus, comprising first and second sides, a top extending across upper ends of the first and second sides, parallel ramps extending upward from a bottom, plural flanges having upper surfaces sloping downward and forward, resilient retainer-ejectors having forks extending along the ramps and having elongated openings between adjacent forks for receiving the ramps, anchors at back ends of adjacent forks, and having fulcrums extending from the forks between the anchors and front ends of the forks, plural leaves extending forward from front ends of the forks, finger-engaging pads at fronts of the leaves, the fulcrums and anchors urging fronts of the leaves upward for urging data cartridges supported on the upward and forward sloping retainer-ejectors toward the top, the leaves and forks being flexible and depressible about the fulcrums for allowing data cartridges to slide downward and forward on the leaves and on sloping upper surfaces of the ramps when fronts of the leaves are depressed.

10. The apparatus of claim 9, wherein the case further comprises a bottom and a back connected to the sides, wherein the ramps extend upward from the bottom and forward from the back, and wherein the leaves urge stored data cartridges against the back.

11. The apparatus of claim 9, further comprising wings on opposite side edges of the leaves for preventing lateral movement of stored data cartridges.

12. The apparatus of claim 9, wherein the anchors comprise first and second anchors and the first anchors comprise a lower edge of the back, and wherein the second anchors comprise upward extensions on rear edges of the retainer-ejector forks and grooves between the extensions for receiving the lower edge of the back.

13. The apparatus of claim 9, wherein the leaves are separated by spaces extending between the leaves parallel to the sides, wherein the spaces extend rearward from finger-engaging pads to the fulcrums, and wherein adjacent forks are joined at the fulcrums and extend rearward to the anchors.

14. The apparatus of claim 9, wherein the retainer ejectors comprise a comb-shaped form with ramp-receiving openings extending between the forks, said openings alternating with spaces between the leaves.

15. The apparatus of claim 9, wherein the fulcrums are downward extending fulcrums connected to the forks between the ramps, and wherein the ramps extend through openings between the forks and extend forward toward rearward edges of the leaves.

16. The apparatus of claim 9, further comprising legs extending downward and inward from opposite sides of the case apparatus, and complementary downward and inward extending grooves in upper corners at intersections of the sides and top of the case apparatus for receiving the legs in interlocking relationship as cases are stacked.

17. The apparatus of claim 9, further comprising downward extending legs at opposite ends of the bottom and forward and rearward extensions on the legs for receiving elastomeric feet, and elastomeric feet connected to the extensions, the elastomeric feet having multiple cavities for connecting first cavities to extensions of legs at the back of one case and connecting other cavities to extensions of a leg of an adjacent case for laterally interconnecting cases in an array.

* * * * *